(12) United States Patent
North et al.

(10) Patent No.: US 8,138,865 B2
(45) Date of Patent: Mar. 20, 2012

(54) HAPTIC FEEDBACK SYSTEM AND METHOD

(75) Inventors: John North, Lombard, IL (US); Deron Stambaugh, Waterman, IL (US)

(73) Assignee: TouchSensor Technologies, LLC, Wheaton, IL (US)

( * ) Notice: Subject to any disclaimer, the term of this patent is extended or adjusted under 35 U.S.C. 154(b) by 270 days.

(21) Appl. No.: 12/047,083

(22) Filed: Mar. 12, 2008

(65) Prior Publication Data

US 2009/0015360 A1   Jan. 15, 2009

Related U.S. Application Data

(60) Provisional application No. 60/894,355, filed on Mar. 12, 2007.

(51) Int. Cl.
*H01H 9/00* (2006.01)
*H01F 7/00* (2006.01)

(52) U.S. Cl. ........ 335/205; 335/206; 335/207; 335/219; 324/151 R

(58) Field of Classification Search .......... 335/205–207, 335/219; 338/32 R, 32 H, 32 S, 12, 68; 323/94 H; 336/110; 307/309; 324/45, 46, 151 R; 345/156, 345/161, 184; 364/188; 200/566
See application file for complete search history.

(56) References Cited

U.S. PATENT DOCUMENTS

| | | | |
|---|---|---|---|
| 3,151,226 A * | 9/1964 | Jones et al. ................ | 335/206 |
| 3,277,413 A * | 10/1966 | Kropp et al. ............... | 335/206 |
| 3,411,155 A | 11/1968 | Watkins | |
| 3,660,789 A * | 5/1972 | Weisenburger ............. | 335/206 |
| 3,988,710 A * | 10/1976 | Sidor et al. ................ | 338/32 R |
| 4,293,837 A * | 10/1981 | Jaffe et al. ................. | 338/32 H |
| 4,349,857 A * | 9/1982 | Tabet ......................... | 361/173 |
| 5,666,096 A | 9/1997 | Van Zeeland | |
| 5,867,082 A * | 2/1999 | Van Zeeland ............... | 335/205 |
| 6,050,718 A | 4/2000 | Schena | |
| 6,100,874 A | 8/2000 | Schena | |
| 6,154,201 A | 11/2000 | Levin | |
| 6,320,487 B1 | 11/2001 | Miller | |
| 6,331,746 B1 | 12/2001 | Fujitana | |
| 6,424,245 B1 | 7/2002 | Rector | |
| 6,636,197 B1 | 10/2003 | Goldenberg | |
| 6,642,824 B2 | 11/2003 | Oomkes | |
| 6,686,911 B1 | 2/2004 | Levin | |
| 6,697,043 B1 | 2/2004 | Shahoian | |
| 6,697,048 B2 | 2/2004 | Rosenberg | |
| 6,704,001 B1 | 3/2004 | Schena | |
| 6,812,816 B1 | 11/2004 | Easton | |

(Continued)

OTHER PUBLICATIONS

Int'l Search Report & Written Opinion issued Nov. 20, 2008, in App. No. PCT/US08/56683.

*Primary Examiner* — Mohamad Musleh
(74) *Attorney, Agent, or Firm* — Barnes & Thornburg LLP

(57) ABSTRACT

A haptic feedback system includes movable and static portions coupled by one or more magnetic fields that serve to retard movement of the movable portion with respect to the static portion so as to provide haptic feedback when the movable portion is moved relative to the static portion. A magnet associated with one of the movable and static portions reacts with structure associated with the other of the movable and static portions so as to provide haptic feedback when the movable portion is moved with respect to the static portion.

15 Claims, 5 Drawing Sheets

U.S. PATENT DOCUMENTS

| | | |
|---|---|---|
| 6,956,558 B1 | 10/2005 | Rosenberg |
| 6,971,143 B2 | 12/2005 | Domroese |
| 7,038,667 B1 | 5/2006 | Vassallo |
| 7,218,498 B2 | 5/2007 | Caldwell |
| 7,423,631 B2 | 9/2008 | Shahoian |
| 2006/0158041 A1 | 7/2006 | Caldwell |

* cited by examiner

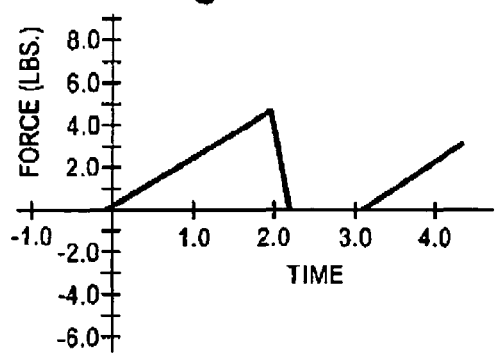
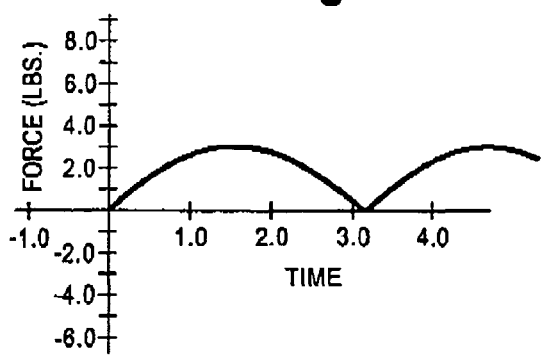
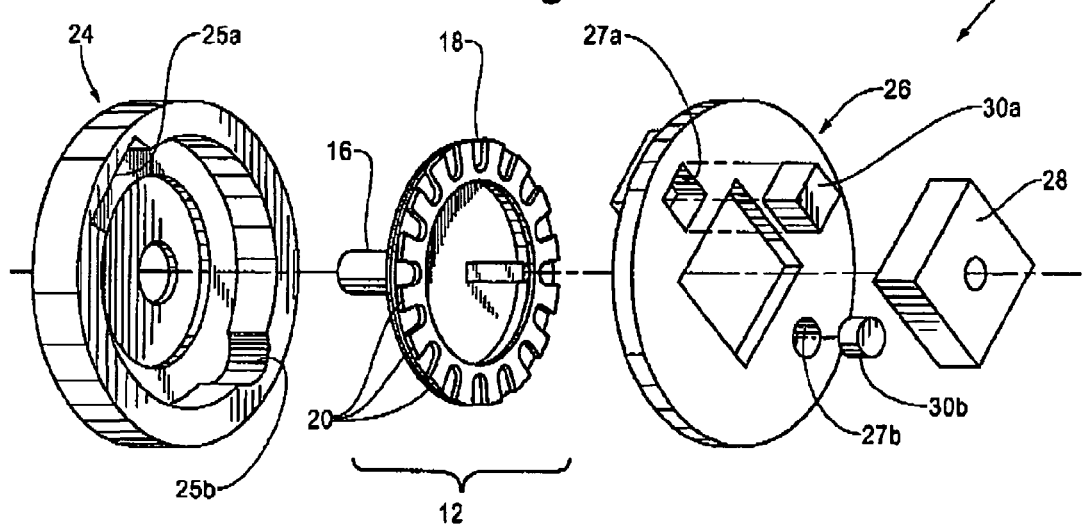
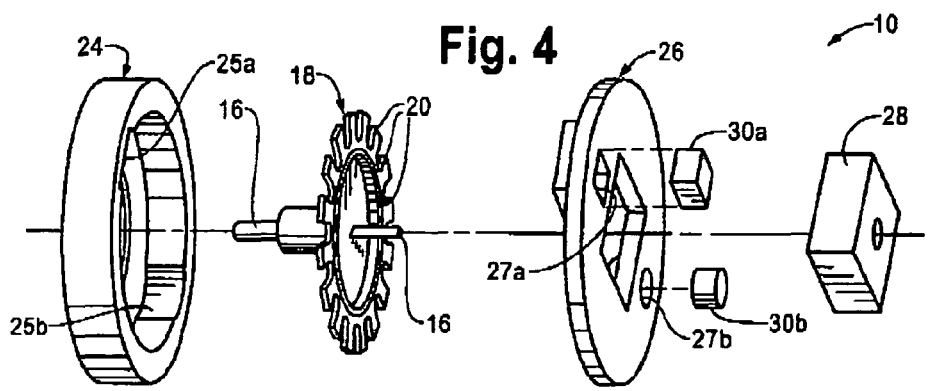

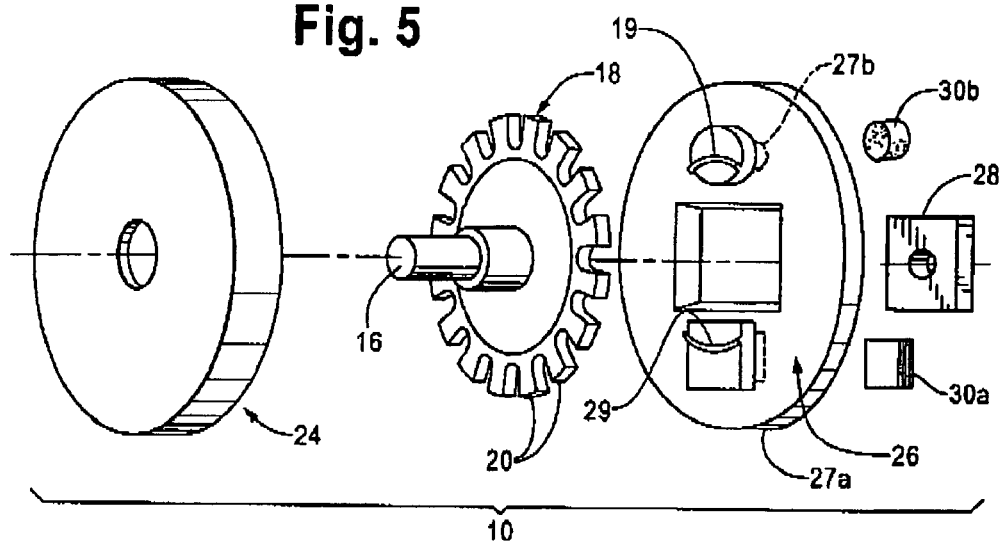
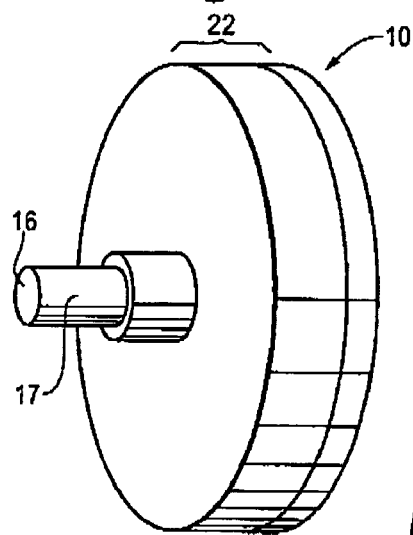
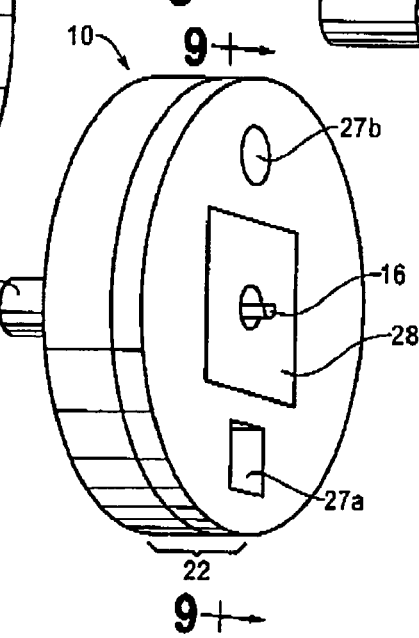
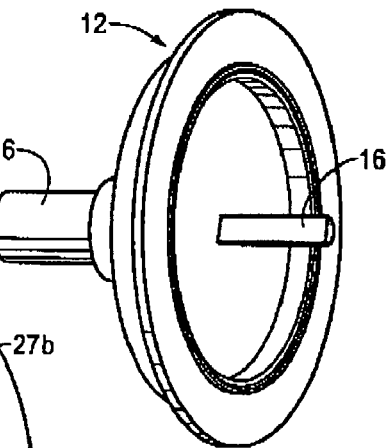

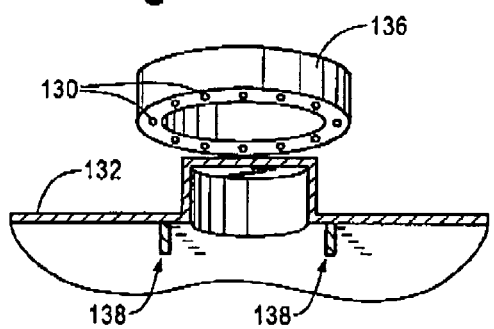
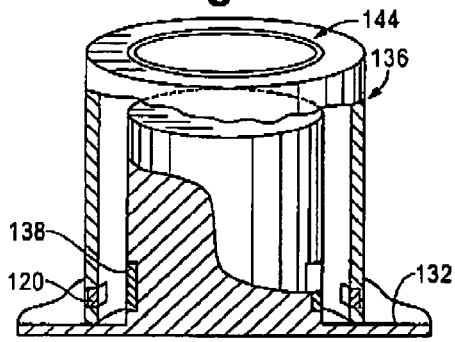
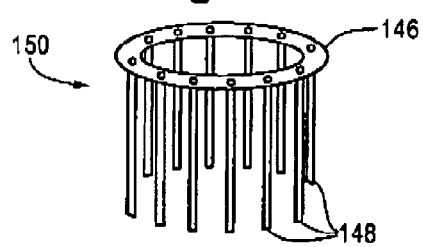
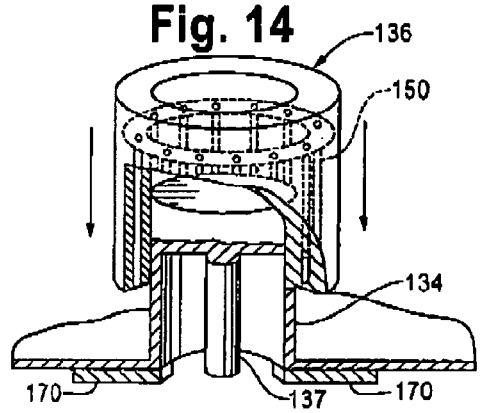
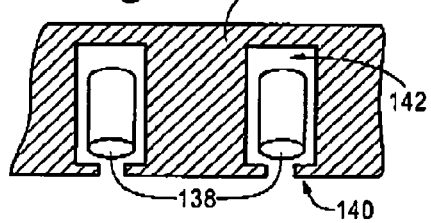
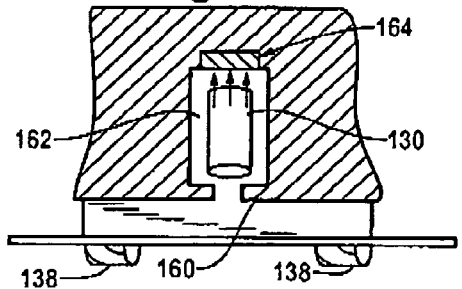
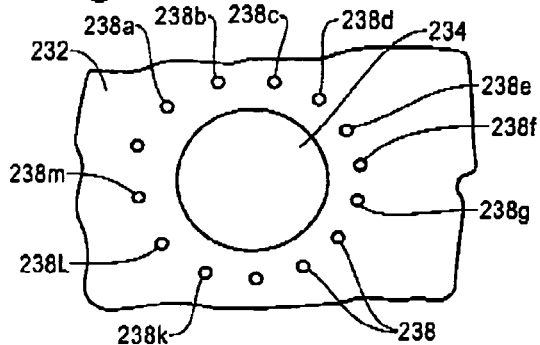
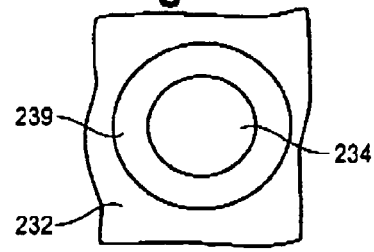

HAPTIC FEEDBACK SYSTEM AND METHOD

CROSS REFERENCE TO RELATED APPLICATIONS

This application claims priority from U.S. Provisional Patent Application No. 60/894,355, filed on Mar. 12, 2007, the disclosure of which is hereby incorporated by reference.

BACKGROUND OF THE INVENTION

1. The Technical Field

The present invention relates generally to systems and methods for providing haptic feedback in connection with, for example, rotary knobs, sliders, and the like.

2. The Related Art

It is known to incorporate a mechanical detent mechanism with a rotary knob to provide the user with tactile feedback regarding the movement and relative position of the knob. Such detent mechanisms typically establish one or more predetermined detent positions toward which the mechanism biases the knob. Typically, some amount of play or slop is associated with each detent such that the biasing force does not precisely center the knob within the detent. Such systems are commonly found in radio and appliance controls.

In order to turn the knob from one detent to the next, a user must apply a force overcoming the biasing force. The applied force necessary to overcome the biasing force typically rises linearly toward a peak and then falls linearly toward a minimum as the knob is turned away from a first detent and toward a second detent. The applied force may remain near such minimum as the knob is further rotated through a region of play. As the user continues to turn the knob away from the second detent and toward a third detent, the user must again apply a force overcoming the biasing force, which applied force may have the same or similar characteristics as set forth above. This phenomenon is illustrated in FIG. 1.

The tactile feedback provided by such prior art systems is less than ideal in at least some circumstances, particularly with respect to the inherent play and/or the discontinuous applied force characteristics illustrated in FIG. I and discussed above. Among other things, these factors can render a control knob difficult to operate precisely and can give such a knob a "cheap" feel.

SUMMARY OF THE INVENTION

The present invention provides haptic feedback using a magnetic "detent" mechanism. A preferred embodiment of a rotary knob assembly having haptic feedback according to the present invention includes a movable portion, for example, a wheel attached to a shaft. The wheel can include a number of ferrous elements corresponding to a desired number of "detent" positions. The ferrous elements can be, but need not be, evenly spaced apart. The wheel and ferrous elements can be embodied, for example, as a cog with ferrous teeth formed about its perimeter. This assembly can be plated, coated, or overmolded, for example, to prevent corrosion.

The movable portion is associated with a static portion, for example, a housing of some sort, having one or more magnets associated therewith. Any suitable form of magnet, for example, permanent magnet or electromagnet, can be used. The magnetic field associated with each such magnet couples with a nearby ferrous element of the wheel, providing an attractive magnetic biasing force that tends to align such ferrous element with the magnet.

A user can rotate the knob by applying a force overcoming the magnetic biasing force. As the knob, and therefore the wheel, is rotated, the applied force rises non-linearly to a peak and then continuously and non-linearly falls to a minimum. The magnetic biasing force tends to positively "center" a particular ferrous element with a nearby magnet, thereby eliminating play or slop when the knob is in one of the "detent" positions. This phenomenon is illustrated in FIG. 2. The applied force characteristics and centering tendency associated with this structure can provide for a higher quality tactile "feel" than typically is obtained with the conventional systems discussed above.

These principles can be applied to non-rotary applications, for example, sliders and the like, as well. Electronic sensors can be associated with both rotary and non-rotary applications to provide, for example, switch functionality.

BRIEF DESCRIPTION OF THE DRAWINGS

FIG. 1 is a diagram showing the characteristics of force required to operate a rotary knob having a conventional, mechanical detent mechanism versus time;

FIG. 2 is a diagram showing the characteristics of force required to operate a rotary knob embodying a haptic feedback system according to the present invention versus time;

FIG. 3 is an exploded perspective view of portions of an embodiment of a rotary knob having a haptic feedback system according to the present invention;

FIG. 4 is an exploded perspective view of portions of an embodiment of a rotary knob having a haptic feedback system according to the present invention;

FIG. 5 is an exploded perspective view of portions of an embodiment of a rotary knob having a haptic feedback system according to the present invention;

FIG. 6 is a perspective view of portions of an embodiment of a rotary knob having a haptic feedback system according to the present invention;

FIG. 7 is a perspective view of portions of an embodiment of a rotary knob having a haptic feedback system according to the present invention;

FIG. 8 is a perspective view of portions of an embodiment of a rotary knob having a haptic feedback system according to the present invention;

FIG. 11 is a perspective view of portions of an embodiment of a rotary knob having a haptic feedback system integrated into a panel according to the present invention;

FIG. 12 is a perspective view of portions of an embodiment of a rotary knob having a haptic feedback system integrated into a panel according to the present invention;

FIG. 13 is a perspective view of a component of an embodiment of a rotary knob having a haptic feedback system and switching functionality according to the present invention;

FIG. 14 is a perspective view of portions of an embodiment of a rotary knob having a haptic feedback system and switching functionality according to the present invention;

FIG. 15 is a side elevation view of portions of an embodiment of a rotary knob having a haptic feedback system with audible feedback according to the present invention;

FIG. 16 is a perspective view of a portion of an embodiment of a rotary knob having a haptic feedback system with audible feedback according to the present invention;

FIG. 17 is a perspective view of portions of an embodiment of a rotary knob having a variable haptic feedback system according to the present invention;

FIG. 18 is a perspective view of portions of an alternate embodiment of a rotary knob having a variable haptic feedback system according to the present invention.

DETAILED DESCRIPTION OF THE ILLUSTRATED EMBODIMENTS

Figure 9:
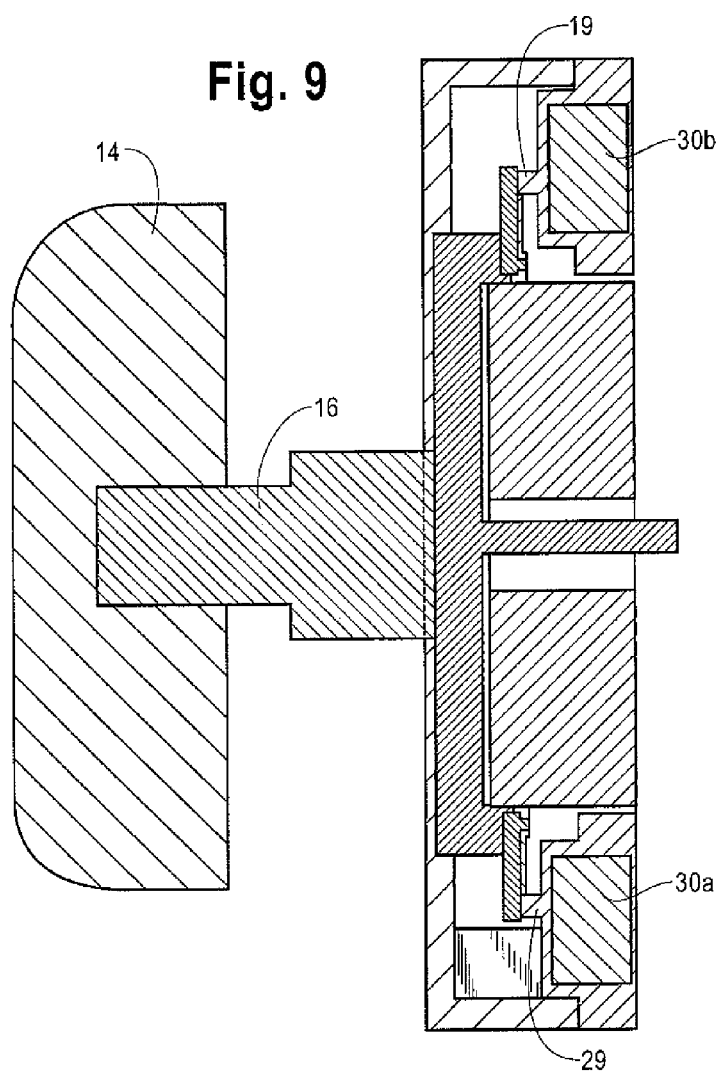
FIG. 9 is a cross-sectional view of portions of a rotary knob having a haptic feedback system according to the present invention.

FIGS. 3-9 and 19 illustrate certain preferred embodiments of a self-contained rotary knob assembly 10 having a haptic feedback system according to the present invention. Assembly 10 includes movable portion 12 comprising knob 14 attached to one end of shaft 16. Shaft 16, in turn, is attached to wheel 18 having a number of ferrous elements 20 which preferably are located near or about the perimeter of wheel 18. As illustrated in, for example, FIG. 3, wheel 18 and ferrous elements 20 can be embodied as a disc with ferrous elements formed therein, or inlaid, embedded, adhered, or otherwise attached to or about the perimeter thereof. As illustrated in, for example, FIG. 5, wheel 18 and ferrous elements 20 can be embodied as a cog having a number of teeth formed about its perimeter. Wheel 18 and ferrous elements 20 could be embodied in other forms, as well. Although the illustrated embodiments include certain numbers of ferrous elements 20 associated with and closely (and evenly) spaced about the perimeter of wheel 18, the number and spacing of ferrous elements 20 can be selected as desired to suit a particular application, as would be understood by one skilled in the art. Indeed, the invention can be operative with as few as one ferrous element 20. Where plural ferrous elements 20 are used, they can be spaced closely, widely, and/or irregularly. Wheel 18 preferably includes bearing surface 19, as shown in FIGS. 3 and 8.

Assembly 10 further includes static portion 22 which is configured to receive movable portion 12 so that movable portion 12 can be rotated therewithin. In the FIGS. 3-10 embodiments, static portion 22 includes top cover 24, bottom cover 26, and encoder 28 which is associated with bottom cover 26. Encoder is an optional element that may be provided to detect and provide an output regarding the position of movable portion 12 with respect to static portion 22, as would be understood by one skilled in the art. One end of shaft 16 can be keyed for predetermined angular engagement with encoder 28, as shown in FIG. 8. Top cover 24 and encoder 28 (or, in applications lacking encoder 28, bottom cover 26) preferably include some form of bearing or bearing surface (not shown) supporting and locating shaft 16 (which preferably includes bearing surface 17), thereby facilitating the rotation of movable portion 12 within static portion 22, as would be understood by one skilled in the art. Top cover 24 and bottom cover 26 can be joined by any suitable means.

In the FIG. 3 embodiment, top cover 24 includes two magnet receiving locations 25 about its perimeter, proximate the perimeter of wheel 18. Magnet receiving location 25a is configured to receive a rectangular magnet (not shown) and magnet receiving location 25b is configured to receive a round magnet (not shown). Bottom cover 26 similarly includes two magnet receiving locations 27 in or about its face proximate the perimeter of wheel 18. Magnet receiving location 27a is configured to receive a rectangular magnet 30a, and magnet receiving location 27b is configured to receive a round magnet 30b. Magnets 30 may be embodied as permanent magnets, electromagnets, or any other suitable type of magnet. The magnet receiving locations can further be configured to receive pole piece spacers in connection with magnets 30. Such pole piece spacers can be used to shape the magnetic fields emanating from magnets 30, as would be understood by one skilled in the art.

A rear face of each magnet receiving location 25,27 preferably includes bearing surface 29 configured to mate with bearing surface 19 on wheel 18. Bearing surfaces 19,29, in embodiments that include them, can help maintain alignment of wheel 18 and shaft 16 within static portion 22 and ease rotation of movable portion 12 within static portion 22. For example, in certain embodiments, the magnetic force(s) applied to wheel 18, either directly or via ferrous elements 20, might tend to cock wheel 18 about the axis of shaft 16, rendering wheel 18 difficult to rotate. Bearing surfaces 19,29 could help mitigate this effect.

The number, style, and placement of magnets 30 and magnet receiving locations 25,27 illustrated in the drawings is exemplary only. Although FIG. 3 illustrates four magnet receiving locations 25,27, the invention can be practiced using only a single magnet 30 associated with static portion 22. In such embodiments, only one magnet receiving location need be provided in association with static portion 22. Even in such single-magnet embodiments, however, it might nevertheless be desirable to provide plural magnet receiving locations in association with static portion 22 to provide manufacturing flexibility. For example, it might be desirable to provide a magnet receiving location configured to receive a rectangular magnet and another magnet receiving location configured to receive a round magnet to allow a single model of top cover 24, bottom cover 26 and/or other static portion member or assembly to be used in connection with a variety of magnets. Other embodiments might use two or more magnets. For example, it might be desirable to use two magnets in connection with static portion 22 in order to provide a stronger detent, finer resolution between detents, or to balance the magnetic forces placed on wheel 18, via ferrous elements 20, by the magnet(s) associated with static portion 22, as would be understood by one skilled in the art.

FIG. 3 illustrates magnet receiving locations 25,27 configured to receive rectangular and round magnets, respectively, because rare earth magnets are commonly available in these shapes. The shape of magnet(s) used in practical embodiments of the invention, however, is a matter of design choice and magnet availability, and need not be limited to rectangular or round.

Although FIG. 3 illustrates magnet receiving locations 25,27 at particular positions in association with static portion 22, the magnet receiving locations associated with static portion 22 need not be positioned exactly as shown in the drawings. Such magnet receiving locations, however, should be positioned so that the magnetic field(s) emanating from magnet(s) received there can be suitably coupled with ferrous elements 20, so as to provide an attractive magnetic force between such magnet(s) 30 and such ferrous elements 20. This magnetic force tends to align a particular ferrous element 20, for example, ferrous element 20a, with a corresponding magnet 30, for example, magnet 30a, so as to orient movable portion 12 in a particular angular orientation with respect to static portion 22. The magnet receiving locations shown in, for example, FIG. 3, are preferred because they facilitate interaction of the magnetic fields of magnets located there with corresponding ferrous elements 20.

Figure 10:
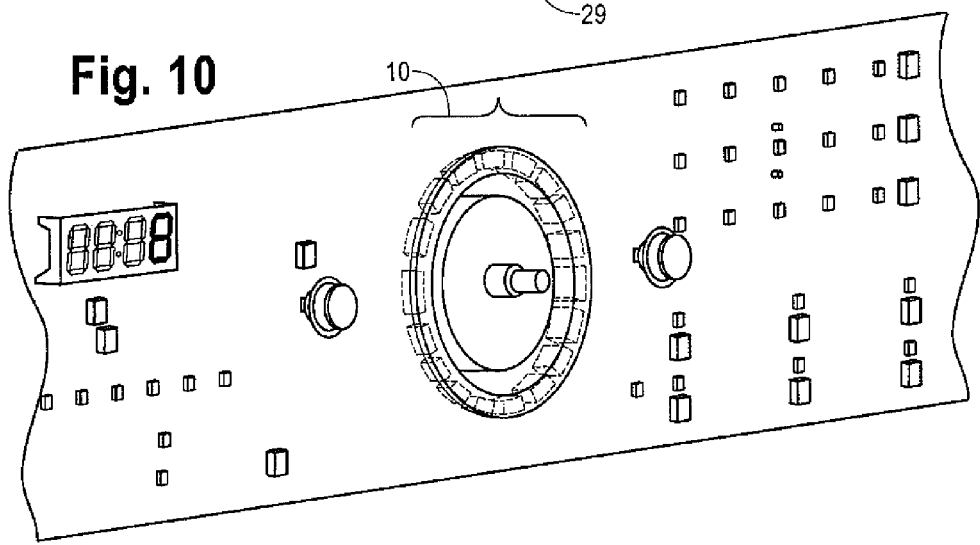
FIG. 10 is a perspective view of a control panel including portions of a rotary knob having a haptic feedback system according to the present invention.
Figure 19:
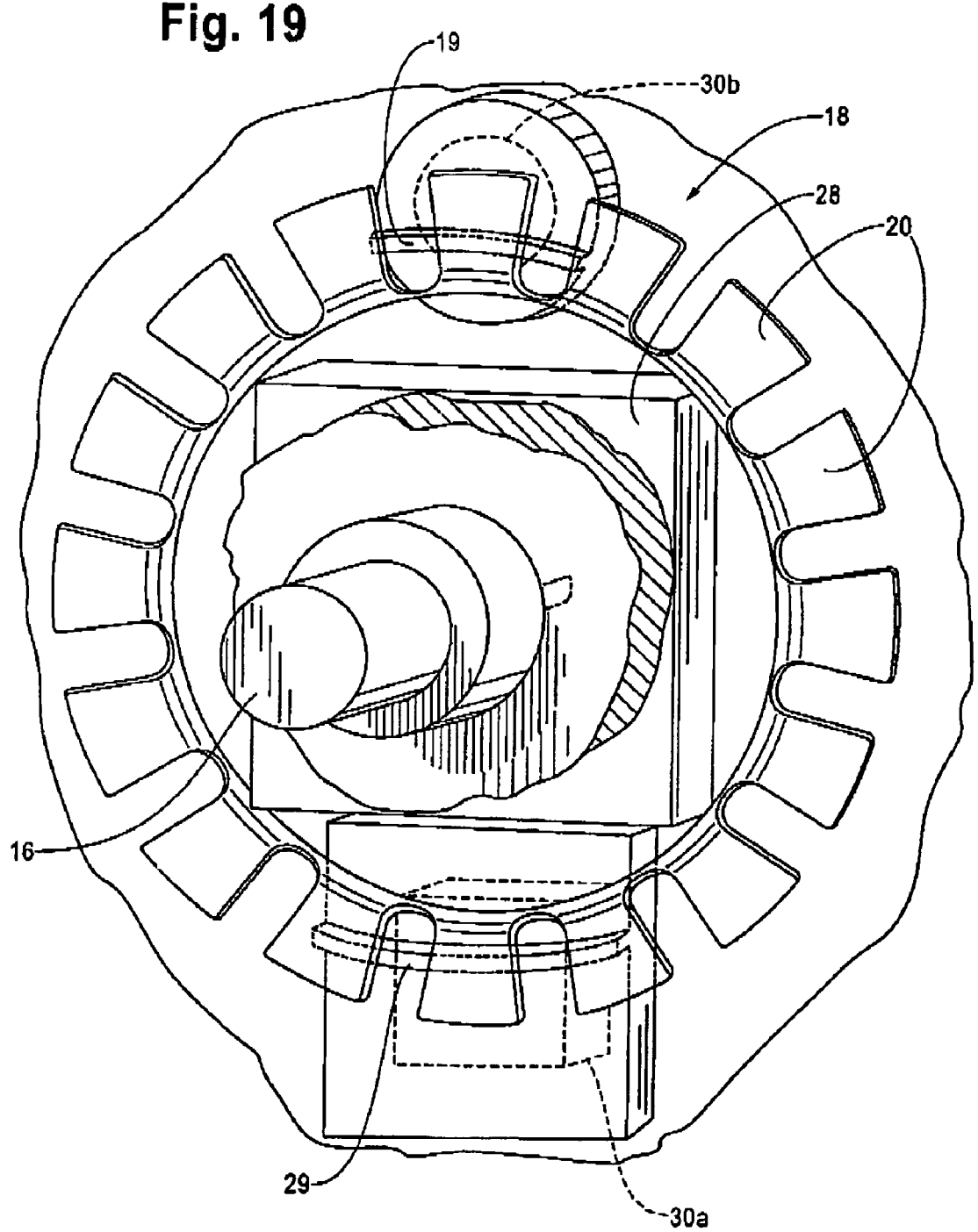
FIG. 19 is a cut-away perspective view of a rotary knob having a haptic feedback system according to the present invention.

Referring to FIGS. 10 and 19, a user can rotate movable portion 12 with respect to static portion 22 by applying to knob 14 a force sufficient to overcome the magnetic coupling force between ferrous element 20a and magnet 30a. As the user rotates knob 14, ferrous element 20a becomes displaced away from magnet 30a and ferrous element 20b becomes displaced toward magnet 30a. Accordingly, the magnetic coupling force between magnet 30a and ferrous element 20a weakens and the magnetic coupling force between magnet 30a and ferrous element 20b strengthens. Once the user has rotated knob 14 through a sufficient angle, the magnetic coupling force between magnet 30a and ferrous element 20b becomes stronger than the magnetic coupling force between magnet 30a and ferrous element 20a, such that magnetic coupling force between magnet 30a and ferrous element 20b tends to align magnet 30a with ferrous element 20b, thereby orienting movable member 12 in another orientation with respect to static member 22. In embodiments having plural magnets 30, for example, magnets 30a and 30b, a similar interaction occurs between magnet 30b and ferrous elements 20c and 20d.

The particular configuration of wheel 18, ferrous elements 20, and magnets 30 can be selected to provide a particular feel and utility, as desired for a particular application and as would be understood by one skilled in the art. Some factors that might be relevant in such design include wheel thickness and material; ferrous element size, shape, and material; tooth shape and size (for example, in embodiments where wheel 18 and ferrous elements 20 take the form of a cog); and magnet size, shape, type, and material. Ferrous elements 20, for example, can be embodied as any suitable material capable of coupling to a magnetic field. Alternatively, one or more of ferrous elements 20 can be magnets having polarity opposite to the polarity of magnets 30, as would be understood by one skilled in the art. In such embodiments, magnets 30 could be embodied as non-magnetized ferrous elements.

Self-contained rotary knob assembly 10 can be assembled into, for example, a control panel or other substrate. One such embodiment is shown in FIG. 10. Alternatively, the principles of the present invention can be applied to integrate a rotary knob with haptic feedback directly into such a panel/substrate by using the panel/substrate as, for example, a surrogate top cover or bottom cover. Such integration could reduce part count and assembly cost.

FIG. 11 illustrates an embodiment of the present invention integrating a rotary knob with haptic feedback into a panel/substrate, for example, a plastic panel, printed circuit board, or the like. Here, panel/substrate 132 includes generally cylindrical raised portion 134. Knob ring 136 is generally annular and configured to receive raised portion 134. Knob ring 136 bears on and can rotate about raised portion 134, thereby rendering a separate shaft, for example, shaft 16 of the previously described embodiments, superfluous. A number of magnets 130 are shown as being embedded within the annular portion of knob ring 136, although more or fewer (as few as one) magnets 130 could be used in practice. Panel/substrate 132 bears magnets 138 which interact with magnets 130 in knob ring 136 to provide haptic feedback, as discussed above. Preferably, magnets 138 are embedded or molded into panel/substrate 132. Alternatively, magnets 138 could be associated with panel/substrate 132 by other means. For example, magnets 138 could be glued or mechanically fastened to panel/substrate 132. Although two magnets 138 are illustrated, more or fewer magnets 138 could be used in practice. In alternative embodiments, one or more of magnets 130 or one or more of magnets 138 could be replaced with non-magnetized ferrous elements, potentially reducing cost.

In the FIG. 11 embodiment, the attractive magnetic forces between magnets 130 and magnets 138 (or between any of such magnets and ferrous elements that might be used in lieu of any other of such magnets) might be sufficient to maintain knob ring 136 in association with panel/substrate 132. Alternatively, any suitable mechanical means, for example, a snap lock mechanism, could be provided to secure knob ring to panel/substrate 132, as would be understood by one skilled in the art.

FIG. 12 illustrates a variation on the FIG. 11 embodiment. In the FIG. 12 embodiment, magnets 138 are located about the periphery of raised portion 134, rather than in the base portion of panel/substrate 132. Knob ring 136 is embodied substantially as disc portion 136a having a number of teeth 136b depending therefrom. Ferrous elements 120 are associated with the ends of teeth 136b. Magnets 138 interact with ferrous elements 120 as discussed above in connection with other embodiments of the invention. In alternate embodiments, magnets 130 can be embodied as ferrous elements, ferrous elements 120 can be embodied as magnets, and ferrous ring 144 can be embodied as a magnetic ring, as would be understood by one skilled in the art. Optional ferrous ring 144 can be embedded in, or otherwise associated with, disc portion 136a. Ferrous ring 144, where provided, interacts with magnets 138 to tend to retain knob ring 136 to raised portion 134 of panel/substrate 132.

The principles of the present invention can be applied to provide a rotary switching apparatus with haptic feedback by, for example, associating one or more touch sensors with panel/substrate 132. Such touch sensors preferably would be embodied as field effect sensors, for example, the TS 100 sensor available from TouchSensor Technologies, LLC of Wheaton, Ill. and disclosed in, for example, U.S. Pat. Nos. 6,320,282 and 7,218,498, the disclosures of which are hereby incorporated by reference. Alternatively, capacitive or other suitable touch sensors may be used. FIGS. 13-14 illustrate panel/substrate 132 having touch sensors 170 embedded in or otherwise associated with panel/substrate 132. Knob ring 136 includes an insert 150 including ring 146 having prongs 148 depending therefrom. All or portions of insert 150 can be ferrous and/or magnetic as would be recognized by one skilled in the art. Insert 150 is embedded in or otherwise associated with knob ring 136, which in turn is positioned on raised portion 134 for rotation thereabout. As knob ring 136 is rotated, touch sensors 170 sense and respond to the approach and departure of prongs 148 toward and from the electric fields associated with the touch sensors to determine, for example, the direction and rate of rotation of knob ring 136, as would be understood by one skilled in the art.

Optional magnet 137 can be provided in connection with, for example, raised portion 134 of panel/substrate 132. Magnet 137, where provided, interacts with ring 146 to tend to retain knob ring 136 to raised portion 134 of panel/substrate 132. One or more magnets (not shown) preferably would be associated with panel/substrate 132, as shown in FIG. 12, to provide haptic feedback as knob ring 136 is rotated, as discussed above.

FIGS. 15-16 illustrate an embodiment of the present invention providing audible, as well as tactile, feedback. In the FIG. 15 embodiment, magnets 138 take the form of magnetic pellets captively retained by retaining lips 140 (or other suitable means, as would be recognized by one skilled in the art) in pockets 142 formed into panel/substrate 132. A biasing force, for example, gravity or a weak spring (not shown) between the top of magnetic pellets 138 and pockets 142 biases magnetic pellets 138 toward the end of pockets 142 distant from knob ring 136 and/or magnets 130. As knob ring 136 is rotated towards alignment of a particular magnet 130 with a corresponding magnetic pellet 138, the attractive magnetic force between such magnet 130 and magnetic pellet 138 eventually overcomes the foregoing biasing force, thereby drawing such magnetic pellet 138 from the distant end of pocket 142 toward the end of pocket 142 proximate knob ring 136 and/or magnets 130. As knob ring 136 is further rotated away from such alignment, the biasing force eventually overcomes the foregoing attractive magnetic force, thereby returning such magnetic pellet 138 toward the distant end of pocket 142. Magnetic pellets 138 make a clicking sound as they cycle between the distant and proximate ends of pocket 142, providing audible feedback regarding the rotation of knob ring 136. In embodiments relying on gravity to bias magnetic pellets toward the distant end of pocket 142, panel/substrate 132 preferably is oriented more toward horizontal than vertical, with the distant end of pockets 142 directed more downwardly than not. Embodiments using a biasing spring as discussed above could be used in similar orientations and other orientations, as well. For example, embodiments using such a biasing spring could be used upside down or with panel/substrate 132 oriented substantially vertically.

In the FIG. 16 embodiment, the audible feature is located in knob ring 136, rather than panel-substrate 132. Here, magnets 138 are fixed to panel/substrate 132 and magnets 130 are be embodied as magnetic pellets movable within pockets 162 formed into knob ring 136. In such embodiments, magnetic pellets 130 could be biased toward the end of their respective pockets 162 distant from panel/substrate 132 and/or magnets 138 by gravity or a weak spring (not shown). Rotation of knob ring 136 would tend to cause magnetic pellets 130 to cycle from the distant end of their respective pockets toward the end 160 of the pockets proximate panel/substrate 132 and/or magnets 138 and back, thereby creating a clicking sound, as discussed above.

FIG. 17 illustrates an embodiment of the present invention providing a rotary knob with variable haptic feedback. Similar to the FIG. 10 embodiment, this embodiment includes panel/substrate 232 includes generally cylindrical raised portion 234. Knob ring 236 is generally annular and configured to receive raised portion 234. Knob ring 236 bears on and is rotatable about raised portion 234, thereby rendering a separate shaft, for example, shaft 16 of the first described embodiments of the present invention, superfluous. Ferrous element 230 is embedded within or otherwise associated with the annular portion of knob ring 236. In certain embodiments, one or more additional ferrous elements 230 could be associated with the annular portion of knob ring 236. Further, any or all such ferrous elements 230 can be embodied as magnets.

Panel/substrate 232 bears electromagnets 238 which can be selectively energized/magnetized, thereby creating magnetic fields thereabout that can interact with ferrous element 230 in knob ring 236 to provide haptic feedback, according to the principles discussed above. Preferably, electromagnets 238 are embedded or molded into panel/substrate 232. Alternatively, electromagnets 238 could be associated with panel/substrate 232 by other means. For example, electromagnets 238 could be glued or mechanically fastened to panel/substrate. Although fourteen electromagnets 238 are illustrated, more or fewer electromagnets 238 could be used in practice. Also, although electromagnets 238 are illustrated as evenly spaced about raised portion 234, they need not be so distributed.

Electromagnets 238 can be selectively energized/magnetized to effectively vary the number, position, and/or strength of the detents associated with knob ring 236. For example, in a first operating mode, all of electromagnets 238 could be energized to provide evenly spaced detents having substantially equal strength. In a second operating mode, every second electromagnet 238 could be energized to provide fewer and more widely, yet evenly, spaced detents having substantially equal strength. In a third operating mode, only certain electromagnets 238, for example, electromagnets 238A/K/M could be energized so that a "detent" is felt only when knob ring 236 is rotated such that a magnet 230 on knob ring 236 is aligned with one of these electromagnets 238. In a fourth operating mode, the strength of the magnetic fields associated with individual ones of electromagnets 238 could be selectively varied, in turn varying the strength of the magnetic coupling between individual electromagnets 238 and a nearby ferrous element 230 associated with knob ring 236.

In an alternate embodiment, as illustrated in FIG. 18, discrete electromagnets 238 can be replaced with a ferrous ring 239, which can be electrically excited to create one or more magnetic poles at corresponding locations about its circumference. This excitation can be software controlled to vary the number, position, and strength of such magnetic poles, as would be understood by one skilled in the art, allowing for on-the-fly variations in detent configuration.

These variable feedback embodiments can be combined with the audible feedback embodiment discussed above to provide variable haptic feedback with audible feedback.

Certain exemplary embodiments are illustrated and described herein. One skilled in the art would recognize that these embodiments could be modified to further exploit the principles of the present invention. As such, the present invention is not limited to the present embodiments but instead is limited only by the claims appended hereto.

The invention claimed is:

1. A system for providing haptic feedback regarding movement of a first member relative to a corresponding second member, comprising:
   a first magnetic field generator associated with one of said first member and said second member;
   a first magnetic field coupler associated with the other of said first member and said second member; and
   a touch sensor associated with said first member;
   wherein said first magnetic field generator establishes a first magnetic field proximate said first magnetic field generator;
   wherein said first magnetic field variably couples to said first magnetic field coupler as a function of the position of said first magnetic field generator relative to the position of said first magnetic field coupler;
   wherein said first magnetic field tends to maintain said first magnetic field coupler in at least a first predetermined relationship with respect to said first magnetic field generator; and
   wherein the operation of said touch sensor is not dependent on said first magnetic field.

2. The system of claim 1 wherein one of said first member and said second member is a static member.

3. The system of claim 2 wherein the other of said first member and said second member is a movable member.

4. The system of claim 1 wherein said first magnetic field generator comprises a permanent magnet.

5. The system of claim 1 wherein said first magnetic field generator comprises an electromagnet.

6. The system of claim 5 wherein said electromagnet is selectively and/or variably magnetizable.

7. The system of claim 1 wherein said first magnetic field coupler comprises a ferromagnetic material.

8. The system of claim 1 wherein said first magnetic field coupler comprises a second magnetic field generator.

9. The system of claim 1 further comprising a second magnetic field generator associated with one of said first member and said second member.

10. The system of claim 9 further comprising a second magnetic field coupler associated with the other of said first member and said second member.

11. The system of claim 1 wherein at least one of said first magnetic field generator and said first magnetic field coupler is in movable engagement with said corresponding static member and movable member.

12. The system of claim 1 wherein said touch sensor comprises at least one sensing electrode and a control circuit adapted to generate an electric field about said sensing electrode and to detect disturbances to said electric field.

13. The system of claim 1 wherein said second member further comprises structure adapted to disturb said electric field in response to movement of said second member with respect to said first member.

14. The system of claim 1 wherein said second member further comprises means for disturbing said electric field in response to movement of said second member with respect to said first member.

15. The system of claim 1 wherein said second member is movable with respect to said first member.

* * * * *